United States Patent [19]
Kokkosoulis et al.

[11] Patent Number: 6,016,550
[45] Date of Patent: Jan. 18, 2000

[54] METHOD AND APPARATUS FOR AUDIO SAMPLE RATE CONVERSION WITHIN A DATA-PROCESSING SYSTEM

[75] Inventors: George Dimitrios Kokkosoulis; Daniel Anthony Temple, both of Austin, Tex.

[73] Assignee: International Business Machines Corporation, Armonk, N.Y.

[21] Appl. No.: 08/982,608

[22] Filed: Dec. 2, 1997

[51] Int. Cl.⁷ .................................................. G06F 5/00
[52] U.S. Cl. ......................................... 713/400; 341/126
[58] Field of Search ................................. 713/400, 503; 341/50, 61, 126; 364/724.1; 704/500, 503; 710/60

[56] References Cited

U.S. PATENT DOCUMENTS

| | | |
|---|---|---|
| 4,202,234 | 5/1980 | Comerford . |
| 5,398,029 | 3/1995 | Toyama et al. ........................... 341/61 |
| 5,524,171 | 6/1996 | De Boisriou . |
| 5,566,101 | 10/1996 | Kodra . |
| 5,570,296 | 10/1996 | Heyl et al. .............................. 709/231 |
| 5,592,165 | 1/1997 | Jackson et al. . |
| 5,621,805 | 4/1997 | Loh et al. ............................... 381/119 |
| 5,875,354 | 2/1999 | Charlton et al. ......................... 710/61 |
| 5,907,295 | 5/1999 | Lin ........................................... 341/61 |

OTHER PUBLICATIONS

Analog Devices et al., "Audio Codec 97, Component Specification", Revision 1.03, Sep. 15, 1996; pp. 1–50.

*Primary Examiner*—Thomas M. Heckler
*Attorney, Agent, or Firm*—Casimer K. Salys; Antony P. Ng; Andrew J. Dillon

[57] ABSTRACT

A method for providing audio sample rate conversion within a data-processing system is disclosed. An audio data stream is first received. If the input sample rate of the audio data stream is not equal to a target sample rate, several frequency multiplications or frequency divisions are selectively performed until the target sample rate is reached. Then, the audio data stream is passed through a lowpass filter having a cutoff frequency that is less than half of the target sample rate. Finally, the audio data stream is output.

12 Claims, 3 Drawing Sheets

METHOD AND APPARATUS FOR AUDIO SAMPLE RATE CONVERSION WITHIN A DATA-PROCESSING SYSTEM

BACKGROUND OF THE INVENTION

1. Technical Field

The present invention relates to a method and apparatus for data processing in general, and in particular to a method and apparatus for processing audio data within a data-processing system. Still more particularly, the present invention relates to a method and apparatus for providing audio sample rate conversion within a data-processing system.

2. Description of the Prior Art

Audio presentation is one of many integral features of a personal computer (PC) system equipped with multi-media options. Typically, audio presentation support is provided by means of either adding an audio add-on board (commonly known as a sound card) to a system board of the PC system or integrating similar hardware within the system board. In both cases, integrated audio codecs are usually utilized to support the audio function. The problem with integrated audio codecs is that a relatively sensitive analog circuit is integrated (or in close proximity) with a relatively noisy digital audio circuit. As a result, the quality of audio presentation is not even comparable with that of an average home stereo.

In an effort to correct this problem, a proposal and a subsequent specification known as the Audio Codec '97 (AC 97) were introduced, with the support of Intel® Corporation and virtually all other audio integrated-circuit device manufacturers such as Analog Devices, National Semiconductor, etc. According to the AC 97 specification, analog and digital audio functions in a PC system environment must be separated into two parts, namely, an analog audio codec and a digital audio controller. Moreover, interface and pinout of analog codecs are standardized in a way that an OEM can mix and match analog codecs and digital controllers from different vendors. Additionally, the analog codec is to operate only at a sample rate of 48 KHz, utilizing up to 20-bit samples.

Despite of all the advantages provided by the AC 97 specification, the rigidity of 48 KHz sample rate presents some problems when interfacing with devices having a commonly used sample rate that is not 48 KHz. Incidentally, sample rate conversions are unavoidable with an AC 97 compliance system. Thus, it is an objective of the present disclosure to describe a method and apparatus for providing audio sample rate conversion within a data-processing system having a digital audio controller that conforms to the AC 97 specification.

SUMMARY OF THE INVENTION

In view of the foregoing, it is therefore an object of the present invention to provide an improved method and apparatus for data processing.

It is another object of the present invention to provide an improved method and apparatus for processing audio data within a data-processing system.

It is yet another object of the present invention to provide an improved method and apparatus for providing audio sample rate conversion within a data-processing system.

In accordance with a method and apparatus of the present invention, an audio data stream is first received. If the input sample rate of the audio data stream is not equal to a target sample rate, several frequency multiplications or frequency divisions are selectively performed until the target sample rate is reached. Then, the audio data stream is passed through a lowpass filter having a cutoff frequency that is less than half of the target sample rate. Finally, the audio data stream is output.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be executed in a variety of data-processing systems under a number of different operating systems. The computer may be, for example, a personal computer, a midrange computer or a mainframe computer. In addition, the computer may be a stand-alone system or part of a network such as a local-area network (LAN) or a wide-area network (WAN). For the purpose of illustration, a preferred embodiment of the present invention, as described below, is implemented on a personal computer system, such as an Aptiva™ series manufactured by International Business Machines Corporation.

Figure 1:
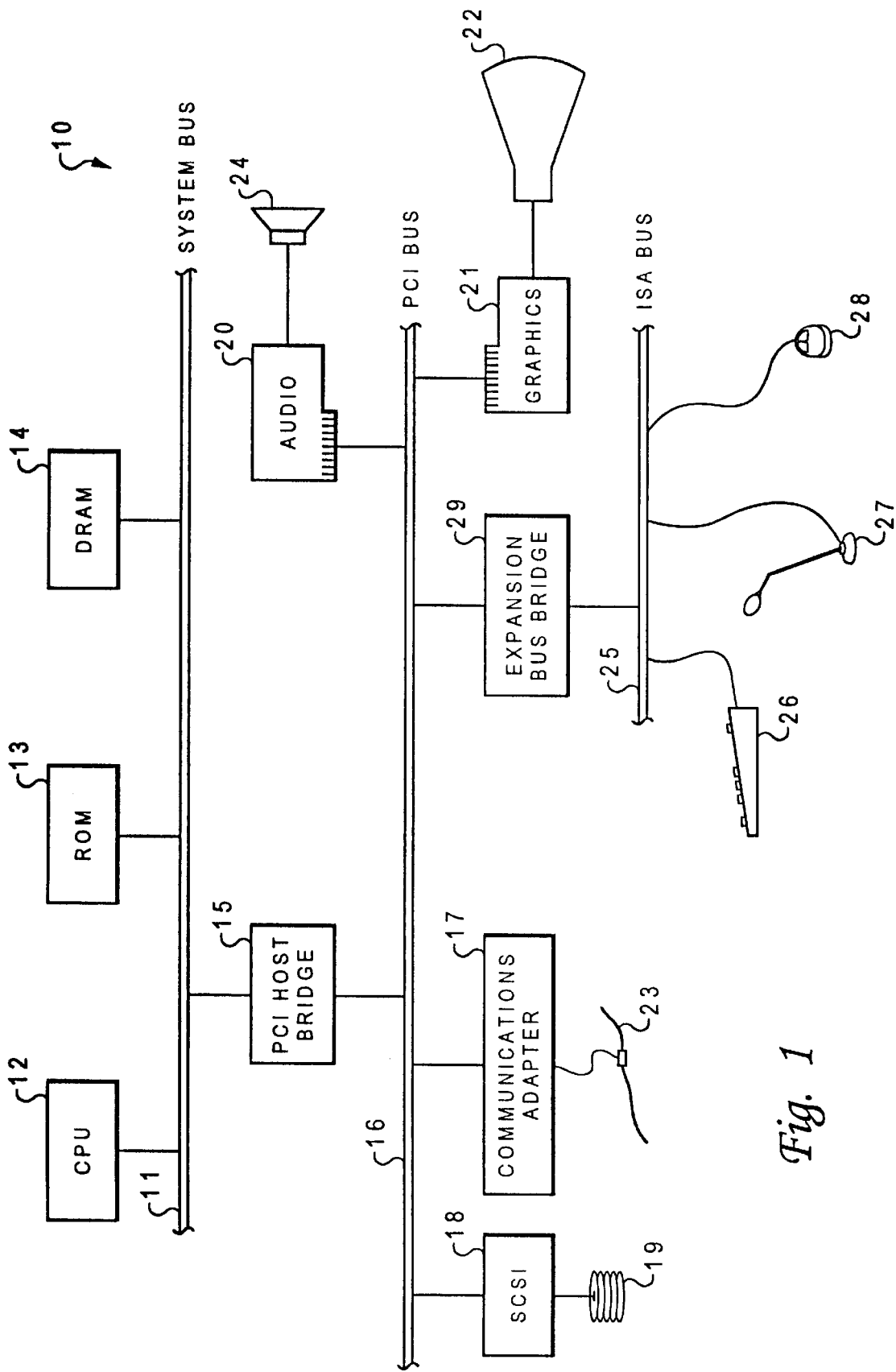
FIG. 1 is a block diagram of a personal computer system in which a preferred embodiment of the present invention is applicable.

Referring now to the drawings and in particular to FIG. 1, there is depicted a block diagram of a personal computer system in which a preferred embodiment of the present invention is applicable. As shown, a central processing unit (CPU) 12, a read-only memory (ROM) 13, and a Dynamic Random Access Memory (DRAM) 14 are connected to a system bus 11 of a personal computer system 10. CPU 12, ROM 13, and DRAM 14 are also coupled to a PCI bus 16 of personal computer system 10 through a PCI host bridge 15. PCI host bridge 15 provides a low latency path through which CPU 12 may directly access PCI devices mapped anywhere within bus memory and/or I/O address spaces. PCI host bridge 15 also provides a high bandwidth path allowing PCI devices to directly access DRAM 14.

Also attached to PCI bus 16 is a communications adapter 17 and a small computer system interface (SCSI) 18. Communications adapter 17 connects personal computer system 10 to a local-area network (LAN) 23. SCSI 18 is utilized to control a high-speed SCSI disk drive 19. Expansion bus bridge 29, such as a PCI-to-ISA bus bridge, may be utilized for coupling an ISA bus 25 to PCI bus 16. As shown, a keyboard 26, a microphone 27, and a mouse 28 may be attached to ISA bus 25 for performing certain basic I/O functions.

In addition, an audio adapter 20 and a graphics adapter 21 may be attached to PCI bus 16. Graphics adapter 21 controls visual output through a video monitor 22 and audio adapter 20 controls audio output through a speaker 24.

Figure 2:
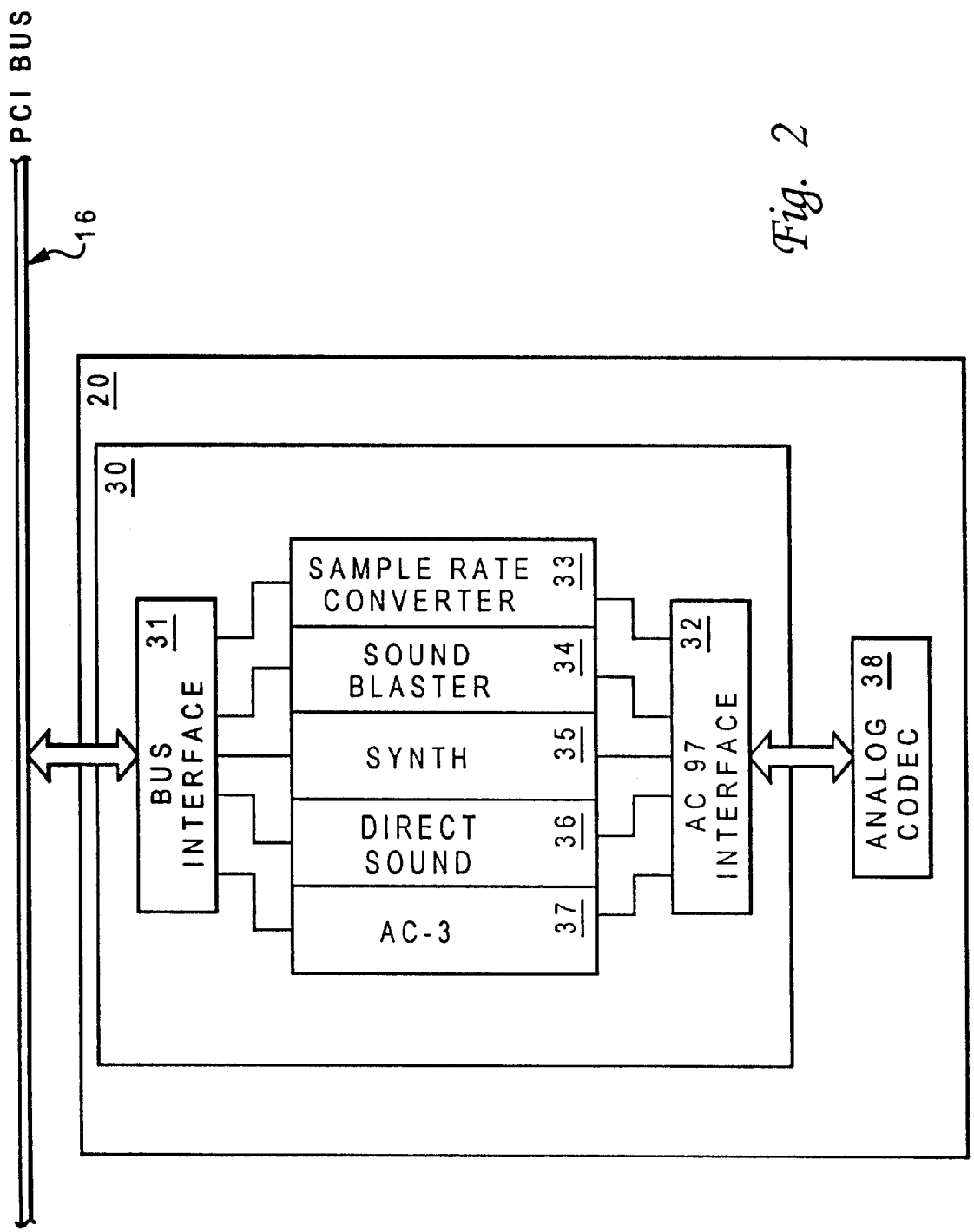
FIG. 2 is a block diagram of an audio adapter within the personal computer system of FIG. 1, in accordance with a preferred embodiment of the present invention.

With reference now to FIG. 2, there is illustrated a block diagram of an audio adapter 20 in accordance with a preferred embodiment of the present invention. Preferably, audio adapter 20 conforms to Audio Codec '97 (AC 97) Component Specification, revision 1.03, the pertinent section of which is incorporated herein by reference. An electronic copy of AC 97 can be found in the following Internet website: http://developer.intel.com/pc-supp/platform/ac97/index.htm. With a digital audio controller 30 and an analog codec 38, audio adapter 20 provides audio function support for personal computer system 10 of FIG. 1. As shown, digital audio controller 30 comprises a bus interface 31 coupled to PCI bus 16 and a point-to-point AC 97 interface 32 coupled to analog codec 38. A headphone or speaker may be connected to analog codec 38 for audio output. Analog codec 38 may also be connected to any serial peripheral device such as a modem, as is well-known in the art. Generally speaking, digital audio controller 30 communicates with analog codec 38 via a digital serial link known as an "AC-link" provided by AC 97 interface 32. All digital audio streams, optional modem line codec streams, and command/status information are communicated over AC 97 interface 32. A more detailed description of the AC-link can be found in Section 5 of the AC 97 component specification.

In addition to bus interface 31 and AC 97 interface 32, digital audio controller 30 also comprises a sample rate converter 33, a SoundBlaster™ module 34, a wavetable synthesis module 35, a DirectSound™ module 36, and an AC-3 module 37. A sample rate conversion algorithm, in accordance with a preferred embodiment of the present invention, may be implemented within sample rate converter 33. If an audio data stream is coming from PCI bus 16 to bus interface 31, the audio data stream will be sent to sample rate converter 33 for processing, if necessary. The processed audio data stream is then passed to analog codec 38 via AC 97 interface 32. On the other hand, if the audio data stream is coming from analog codec 38, the path for the audio data stream will begin at AC 97 interface 32, then sample rate converter 33, and finally bus interface 31 before reaching PCI bus 16.

SoundBlaster™ module 34 enables audio adapter 20 to have SoundBlaster™ compatibilities. Wavetable synthesis module 35 enhances sound qualities for music instrument digital interface (MIDI) inputs. DirectSound™ module 36 and AC-3 module 37 allow audio adapter 20 to be DirectX™ and Dolby Digital™ compatible.

In accordance with a preferred embodiment of the present invention, a sample rate conversion algorithm incorporates three main concepts: frequency multiplication, frequency division, and signal filtering. Depending on the sample rate conversion desired, the operational sequence of the first two concepts will change (or interleave) in order to accommodate different sample rates. Since the required sample rate under AC 97 is 48 KHz, some commonly encountered examples of sample rate conversion are as follows: 48 KHz to 44.1 KHz; 48 KHz to 32 KHz; 48 KHz to 22.05 KHz; 48 KHz to 16 KHz; 48 KHz to 11.025 KHz; 48 KHz to 8 KHz; 44.1 KHz to 48 KHz; 32 KHz to 48 KHz; 22.05 KHz to 48 KHz; 16 KHz to 48 KHz; 11.025 KHz to 48 KHz; and 8 KHz to 48 KHz. The above list of examples is not exhaustive, and a method of sample rate conversion under the present invention may be adaptive in order to accommodate any other sample rates encountered.

Frequency multiplication

Frequency multiplication is achieved by a technique known as "linear interpolation." For any given time domain digital audio signal, x(n), a linear interpolation inserts M−1 samples between every x(n) and x(n+1) samples, where M is an integer multiplication factor needed to reach a target sample rate. These new samples are equally spaced in time based on the target sample rate and magnitude, according to the equation [x(n+1)−x(n)]/M.

Frequency division

Frequency division is accomplished by a technique known as "decimation." For any given time domain digital audio signal, x(n), a decimation retains one sample out of every $D^{th}$ sample, where D is the integer division factor needed to reach the target sample rate.

Signal filtering

Signal filtering is achieved by a mathematical operation known as "convolution." Basically, a convolution is a point-by-point dot product of digital audio signals and filter coefficients over an entire length of a filter. For example, in the present invention, coefficients from a finite impulse response (FIR) filter are convolved with magnitudes of an incoming digital audio data stream, in a time domain. Convolution in the time domain is more preferable for the present invention because it obviates the need to perform a time-consuming discrete Fourier transform (as well as an inverse Fourier transform) on the audio data stream if the similar operation were to be performed in a frequency domain. Because of low error, simple time domain mathematics, and guaranteed zero degree phase response, an ideal lowpass filter model is likely to be achieved. In addition, because time domain FIR filter coefficients are symmetrical and need to be calculated only once, the amount of memory required to store these coefficients is minimized. In order to further reduce errors, the FIR filter is designed with a very high cutoff frequency so that as much signal frequency content can be passed as possible, while leaving adequate frequency margin to guard against aliasing caused by under-sampling.

Signal filtering can fit into the sequence of frequency multiplication and frequency division in one of two ways: after every frequency multiplication/division or only after the last frequency multiplication/division. The latter way offers several advantages and is preferable for a more portable and streamlined implementation. For example, as with all FIR filters, there is some frequency domain error introduced when a FIR filter is time-limited; accordingly, a multi-filter configuration will inherently compound this error after every filter stage and pass the error into the signal itself. Thus, a single filter configuration yields a much lower error overall, and this is why a multi-filter design requires far more filter coefficients than a single filter design in order to meet a defined error limit.

Incidentally, a single filter configuration will reduce the amount of memory needed to store all required coefficients as well as reducing the number of operations per convolution. Also, less leading signal data is lost (due to convolution) with a single filter configuration than the compounded loss due to a multi-filter design. Overall, a single filter configuration performs far fewer arithmetic operations for a given sample rate conversion because the overall number of convolutions required may be reduced. While both single-filter and multi-filter techniques can be easily implemented in software to operate on a fixed-length signal, the single-filter technique is considerably faster and can be more easily for implementing in hardware. In fact, logical operations on a continuous data stream in hardware become a reference nightmare and nearly a real-time impossibility with a multi-filter technique.

Figure 3:
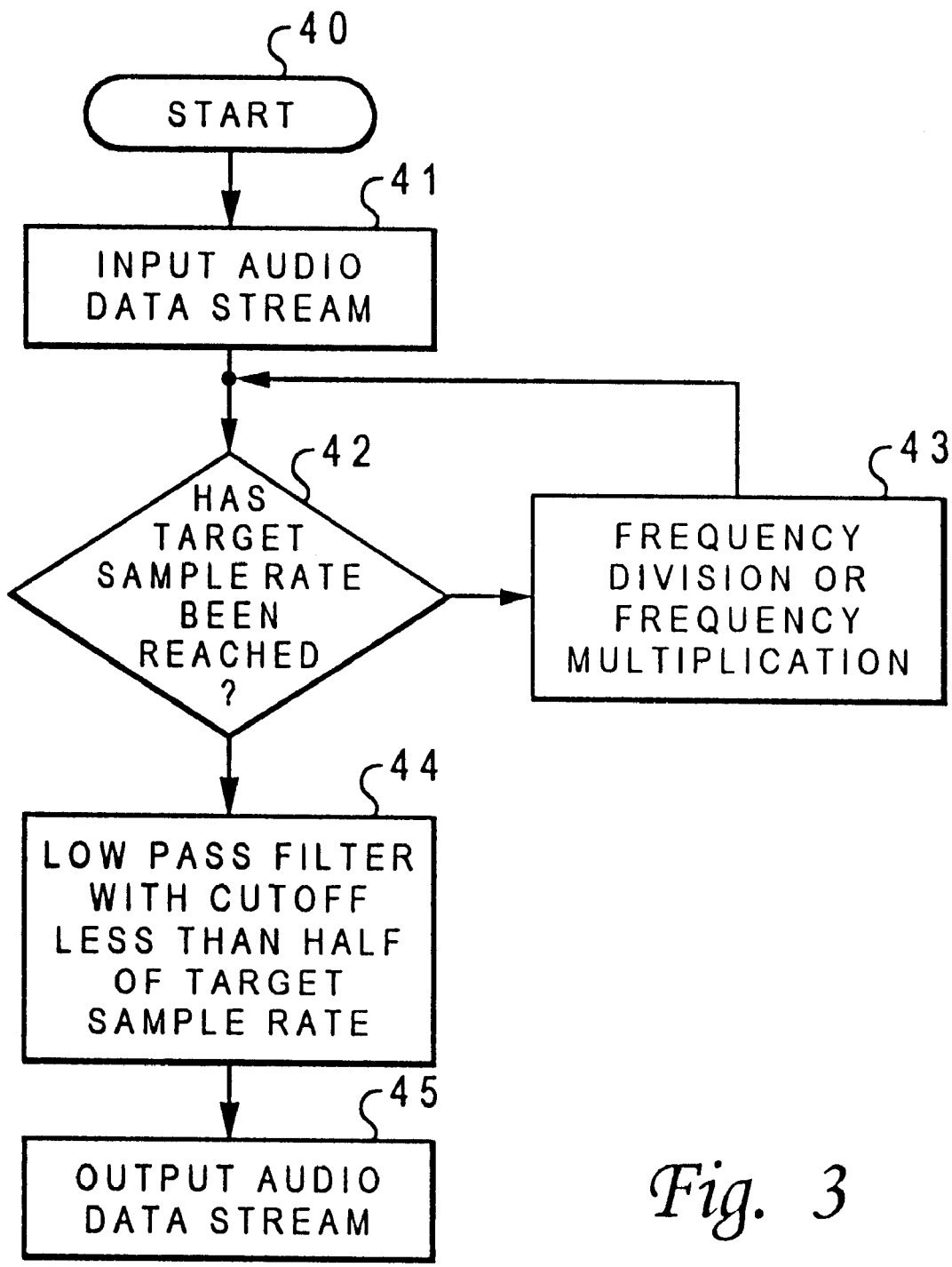
FIG. 3 is a high-level logic flow diagram of a method for providing audio sample rate conversion, in accordance with a preferred embodiment of the present invention.

Referring now to FIG. 3, there is illustrated a high-level logic flow diagram of a method for providing audio sample rate conversion within a data-processing system, in accordance with a preferred embodiment of the present invention. Starting at block 40, an audio data stream having a sample rate $f_{in}$ is input into a digital audio controller, as shown in block 41. Referring back to FIG. 2, the audio data stream may come from either PCI bus 16 or analog codec 38.

Next, a determination is made as to whether or not a target sample rate has been reached, as depicted in block 42. If the audio data stream is coming from PCI bus 16, the target sample rate is 48 KHz; however, if the audio data stream is coming from analog codec 38, the target sample rate could be 48 KHz or any rate other than 48 KHz. But regardless of the source of the audio data stream, if the sample rate of the incoming audio data stream does not equal the target sample rate, a frequency multiplication or frequency division must be preformed on the audio data stream, as illustrated in block 43.

In accordance with a preferred embodiment of the present invention, the sequence of frequency multiplication and frequency division is determined by a prime factorization of the sample rate ratio as well as the combination of those prime factors to reduce the overall number of filter stages and arithmetic operations. These factors become the integer multiplication and division factors described supra. Interpolation and decimation stages are then sequenced such that a minimum amount of memory is needed for all operations. Also, the resultant sample rate after any stage must be maintained at a higher rate than the original sample rate (except after the final stage of a sample rate conversion from a higher sample rate to a lower sample rate) so that the maximum frequency content of the original audio data stream reaches the output.

Taking the conversion of a 44.1 KHz incoming sample rate to a 48 KHz target sample rate as an example, the sample rate ratio required for this conversation would be 48/44.1. The prime integer factorization for 48/44.1 is 160/147 or (5×25)/(7×3×7). By expressing $2^5$ as 4 times 8, the incoming digital audio samples need to be multiplied by 5, 4, 8, and then divided by 7, 3, and 7, in order to achieve the 48 KHz target sample rate. These multiplication and division operations can be performed in any order to minimize the necessary storage space. In this case, the optimal sequence should be to multiply by 8, divide by 7, multiply by 5, divide by 3, multiply by 4, and finally divide by 7.

After several cycles when the target frequency has finally been reached, the audio data stream is then sent to a lowpass FIR filter having a cutoff frequency of less than half of the target sample rate, as illustrated in block 44. Finally, the audio data stream is output, as shown in block 45.

As has been described, the present invention provides a method and apparatus for providing audio sample rate conversion within a data-processing system by utilizing three main concepts-frequency multiplication, frequency division, and signal filtering. Frequency multiplication and frequency division are achieved by linear interpolation and decimation, respectively. Linear interpolation is preferred because it does not require any additional amplification, thus a unity gain filter can be utilized with low error and high signal quality. Linear interpolation also guarantees that ghost samples are not created. In other words, local maximum and minimum sample points are maintained, implying that new higher frequency components are not created.

Although another scheme of frequency multiplication that interpolates zero valued samples between existing samples can also be utilized, this scheme is not preferable for the present invention because when filtering a zero interpolated signal, it is necessary to amplify the resultant signal, and these zeros will naturally decrease overall signal magnitude. By amplifying the signal, either during or after filtering, any error or noise present in the passband of the filter will also be amplified.

It is also important to note that although the present invention has been described in the context of a fully functional data-processing system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include without limitation recordable-type media such as floppy disks or CD ROMs, and transmission-type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for providing audio sample rate conversion within a data-processing system, said method comprising the steps of:

accepting an incoming audio data stream having an input sample rate;

selectively performing a plurality of frequency multiplications or a plurality of frequency divisions to data samples of said audio data stream until a target sample rate is reached, wherein exact numbers of said frequency multiplications and said frequency divisions are determined by a prime factorization of a sample rate ratio;

filtering said data samples from said audio data stream with a lowpass filter; and outputting said data samples from said audio data stream at said target sample rate.

2. The method according to claim 1, wherein said frequency multiplication is performed by linear interpolation.

3. The method according to claim 1, wherein said frequency division is performed by decimation.

4. The method according to claim 1, wherein said cutoff frequency is less than half of said target sample rate.

5. A data processing system for providing audio sample rate conversion, comprising:

means for accepting an incoming audio data stream having an input sample rate;

means for selectively performing a plurality of frequency multiplications or a plurality of frequency divisions to data samples of said audio data stream until a target sample rate is reached, wherein exact numbers of said frequency multiplications and said frequency divisions are determined by a prime factorization of a sample rate ratio;

a lowpass filter for filtering said data samples from said audio data stream; and means for outputting said data samples from said audio data stream at said target sample rate.

6. The data-processing system according to claim 6, wherein said frequency multiplication is performed by linear interpolation.

7. The data-processing system according to claim 5, wherein said frequency division is performed by decimation.

8. The data-processing system according to claim 5, wherein said cutoff frequency is less than half of said target sample rate.

9. A computer program product residing on a computer usable medium for providing audio sample rate conversion within a computer system, said computer product comprising:

program code means for accepting an incoming audio data stream having an input sample rate;

program code means for selectively performing a plurality of frequency multiplications or a plurality of frequency divisions to data samples of said audio data stream until a target sample rate is reached, wherein exact numbers of said frequency multiplications and said frequency divisions are determined by a prime factorization of a sample rate ratio;

program code means for filtering said data samples from said audio data stream; and program code means for outputting said data samples from said audio data stream at said target sample rate.

10. The computer program product according to claim 9, wherein said frequency multiplication is performed by linear interpolation.

11. The computer program product according to claim 9, wherein said frequency division is performed by decimation.

12. The computer program product according to claim 9, wherein said program code means for filtering furthers includes a program code means for filtering with a cutoff frequency at less than half of said target sample rate.

* * * * *